E. J. & I. G. SEIFRIED.
RESILIENT HUB FOR VEHICLE WHEELS.
APPLICATION FILED FEB. 13, 1911.
1,022,567.
Patented Apr. 9, 1912.
3 SHEETS—SHEET 1.
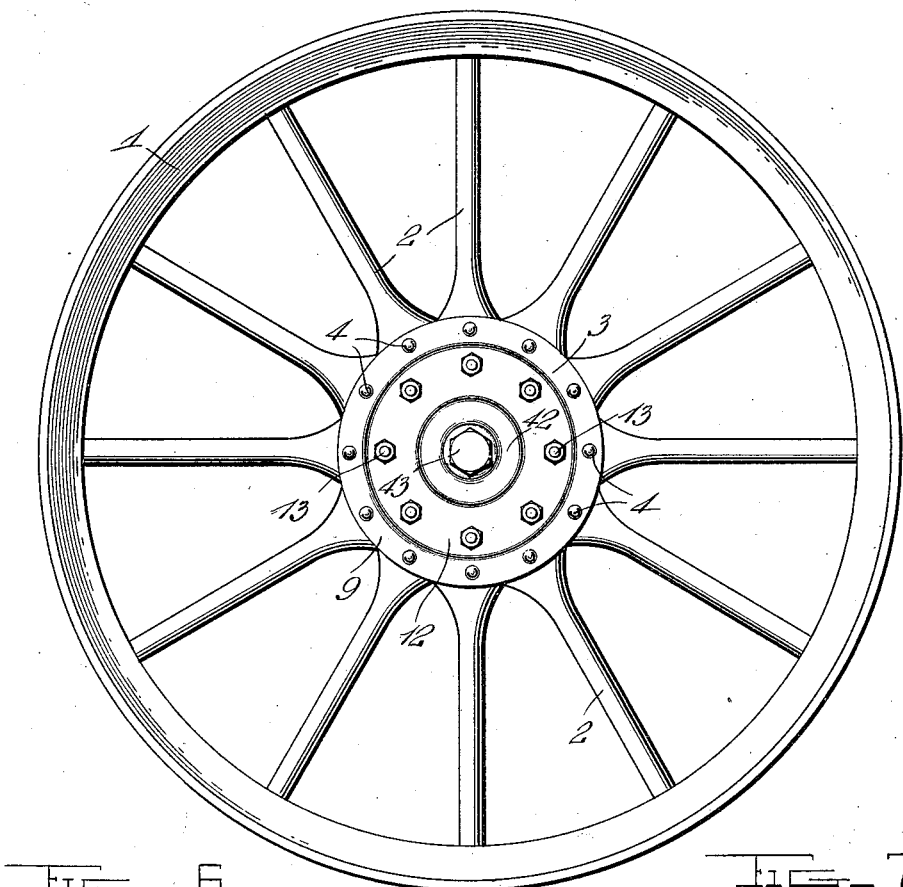
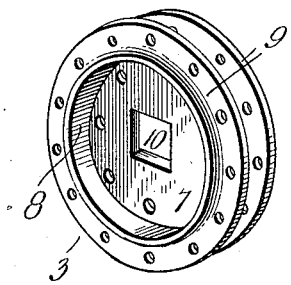
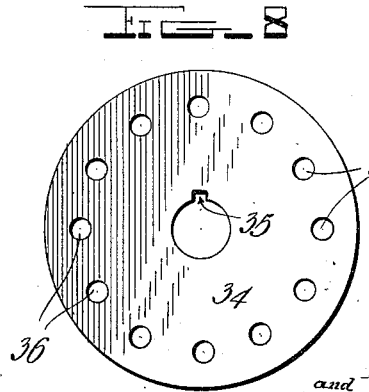
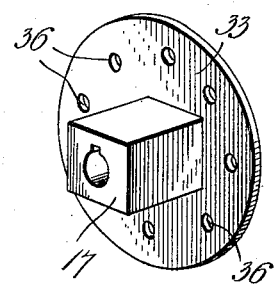
Witnesses
Inventors
Earl J. Seifried
and Isaac G. Seifried
by H. B. Willson & Co.
Attorneys

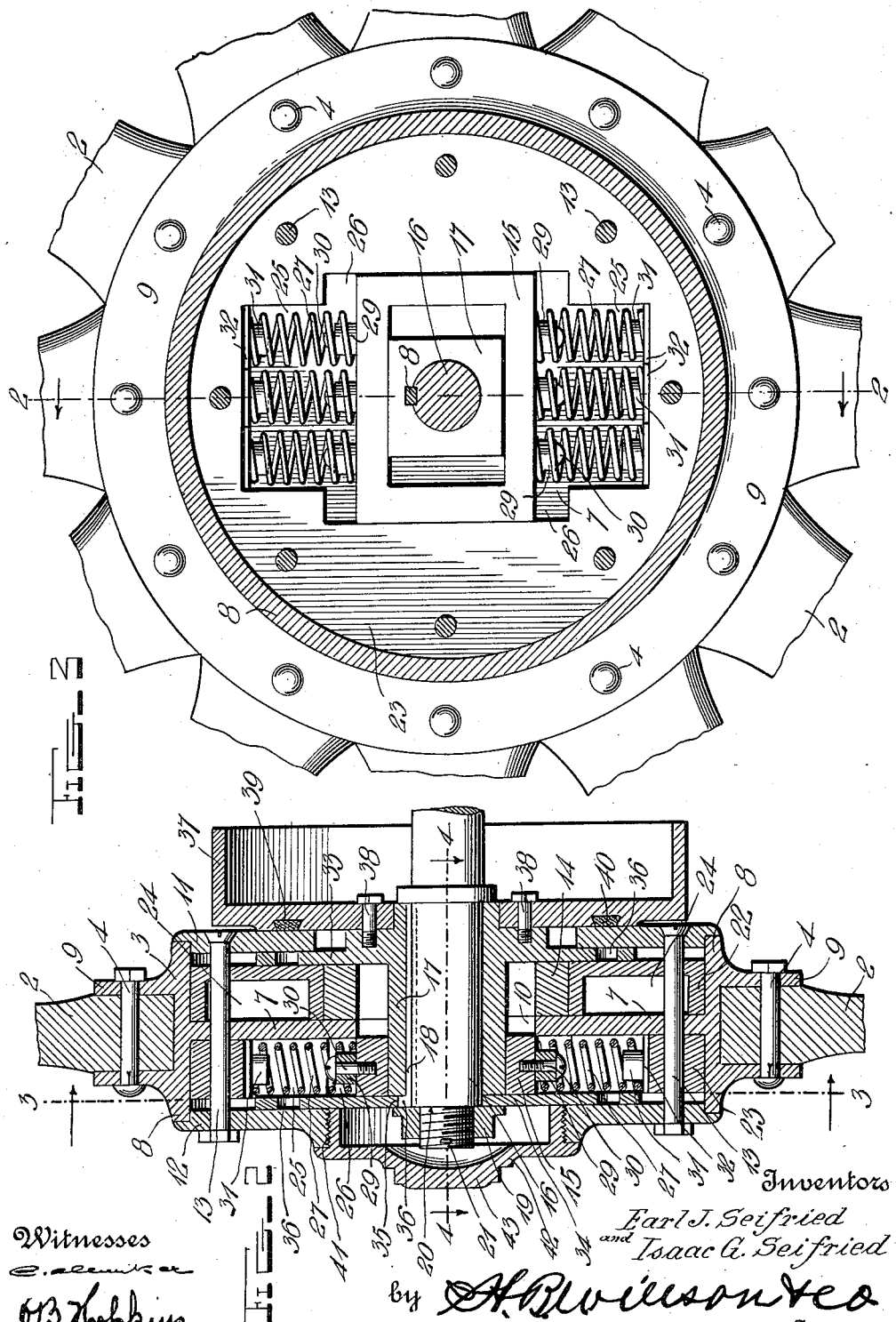

E. J. & I. G. SEIFRIED.
RESILIENT HUB FOR VEHICLE WHEELS.
APPLICATION FILED FEB. 13, 1911.
1,022,567.
Patented Apr. 9, 1912.
3 SHEETS—SHEET 3.
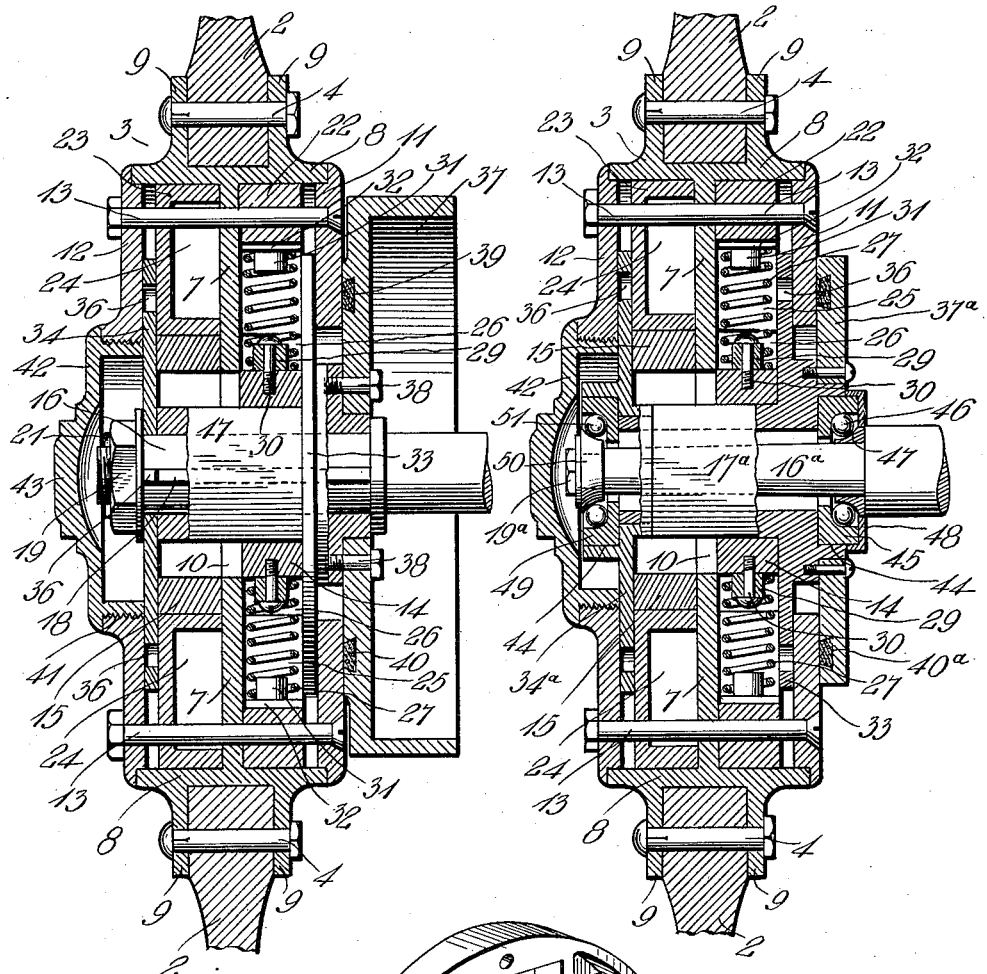
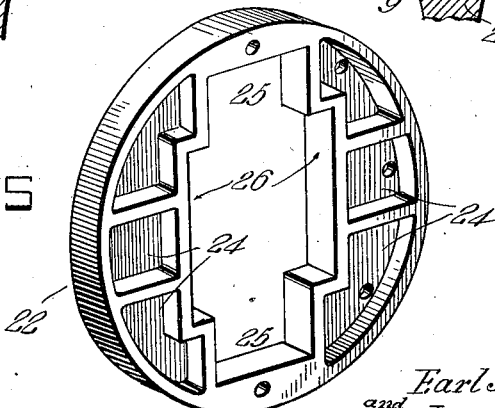
Witnesses
Inventors
Earl J. Seifried
and Isaac G. Seifried
by their Attorneys

UNITED STATES PATENT OFFICE.

EARL J. SEIFRIED AND ISAAC G. SEIFRIED, OF FINDLAY, OHIO.

RESILIENT HUB FOR VEHICLE-WHEELS.

1,022,567.

Specification of Letters Patent. Patented Apr. 9, 1912.

Application filed February 13, 1911. Serial No. 608,432.

*To all whom it may concern:*

Be it known that we, EARL J. SEIFRIED and ISAAC G. SEIFRIED, citizens of the United States, residing at Findlay, in the county of Hancock and State of Ohio, have invented certain new and useful Improvements in Resilient Hubs for Vehicle-Wheels; and we do declare the following to be a full, clear, and exact description of the invention, such as will enable others skilled in the art to which it appertains to make and use the same.

Our invention relates to improvements in resilient wheels more especially adapted for use on automobiles, wagons and other vehicles, although it may be used in other places where it is desired to have a resilient connection between a rotating member, such as a wheel rim, and an axle or analogous support.

One object of the invention is to provide a resilient hub or wheel which will obviate the necessity for the use of pneumatic tires, and which is of such construction that the wheel will have at its hub all the rigidity of an ordinary hub and yet at the same time effectively prevent shocks and jars incidental to travel over roads being imparted to the vehicle supported by the wheel.

Another object of the invention is to provide a hub or device of this character which may be used in connection with a shaft drive as well as with a drive of another form, or merely as a supporting or steering wheel, the construction being such that when used as a shaft driven wheel the transmission of force will be effected through flat slidably engaged members, and, consequently, there will be no lateral strain on the springs or other cushioning means which are interposed between the axle and the wheel structure for the purpose of absorbing shocks and jars.

A further object of the invention is to provide a simple, practical and efficient resilient hub or wheel composed of crossed or intersecting link members slidably arranged to move in planes at different angles and against cushioning devices, such as springs, the members and springs being suitably supported and guided in the wheel structure while the axle or axle member is resiliently supported for movement in any direction, within certain limits, by its slidable engagement with the link members.

The invention further resides in the novel features of construction and in the combination and arrangement of parts hereinafter fully described and claimed and illustrated in the accompanying drawings, in which:

Figure 1 is a side elevation of a wheel embodying our invention; Fig. 2 is a vertical sectional view through the hub of the wheel, the plane of the section being indicated by the line 2—2 in Fig. 3; Fig. 3 is a vertical sectional view taken on the plane indicated by the line 3—3 in Fig. 2; Fig. 4 is a horizontal sectional view taken on the plane indicated by the line 4—4 in Fig. 2; Fig. 5 is a perspective view of one of the spring and link-supporting and guiding plates; Fig. 6 is a perspective view of the hub-members; Fig. 7 is a perspective view of the axle member or sleeve; Fig. 8 is a side view of one of the spring and link retaining plates, and Fig. 9 is a sectional view showing the invention embodied in a non-driven wheel and provided with ball bearings.

The preferred embodiment of our invention, which we have illustrated in the drawings, contemplates the flexible and resilient or cushioning connection arranged in the hub of a wheel, which latter may have a rim or tread portion 1 of any form and construction, and it may be united to the hub by spokes 2, or in any other manner. When the invention is embodied in a resilient wheel hub, the hub forms the casing and support for the principal parts of the invention, and while this casing or hub structure may be made in various ways, we preferably construct it as illustrated in the drawings. Upon referring more particularly to Fig. 2 it will be noted that this hub or casing 3 comprises a main member channeled to receive the spokes 2, which latter are bolted or otherwise secured, as at 4, to provide a strong and rigid connection. The hub member or casing 3 consists of a central portion or plate 7, two oppositely projecting annular rim portions or flanges 8 and spaced radially projecting annular flanges 9, the latter forming the channel to receive the spokes, and having apertures through which the bolts or fastenings 4 extend. The portion or plate 7 is formed with a central opening 10 of sufficient size to allow the axle which extends through it, to have the desired movement relative to the wheel. The casing or hub member 3 is closed by inner and outer plates 11, 12, which are grooved or shouldered to engage the rims 8 and which are removably secured by bolts or analogous fastenings 13 (see Figs. 1 and 2).

The preferred manner of constructing and arranging the parts of the invention which constitute the yielding and cushioning connection between the wheel and axle, comprises at least two shiftable members which are arranged crosswise with respect to each other and which move in different planes, their movement being cushioned by springs or other cushioning means and being controlled by suitable guides in the hub or casing, as illustrated for example in Figs. 3 and 5. The two crossed shiftable members are here shown in the form of open rectangular plates or links 14, 15, and they receive the axle 16 or a squared or flat faced axle member or sleeve 17, preferably made separate from the axle but united thereto by the longitudinal key 18 or any other analogous fastening means. This axle member or sleeve 17, is, of course, keyed to the axle or shaft 16 when the wheel is to be used with a shaft-drive, as in Fig. 2, and said member 17 is removably retained on the axle preferably by means of a nut 19 screwed on a reduced threaded extremity of the axle so as to hold the sleeve or member 17 against a shoulder 20 formed by an annular flange on said axle. A cotter pin 21, or other locking device, is preferably employed to prevent the nut 19 from working loose.

As stated above, the link members 14 are of rectangular shape, as shown more clearly in Fig. 3, the short sides of their openings being of just sufficient size to receive the squared portion of the axle sleeve 17, so that the links can slide transversely or crosswise of the axle and, in the embodiment of the invention illustrated, in planes at right-angles to each other. The link members 14 are supported and guided in members or plates 22, 23, arranged in the hub member or casing 3 and are apertured to receive the bolts or fastenings 13 which hold the parts of the hub assembled. The supporting and guiding members 22, 23, are similar, each being circular in shape to fit within the rim flanges 8 of the hub member or casing 3, and against the central portion or plate 7 thereof. To reduce the weight of the members or plates 22, their opposing inner faces are preferably recessed as shown at 24 in Fig. 5, although it will be understood that these plates and other parts may be otherwise constructed. The central portions of the members or plates 22, 23, are formed with transversely extending rectangular openings 25, which have enlarged central portions 26 adapted to receive the extremities of the link members 14, 15, as shown more clearly in Fig. 3.

The guide recesses 26 are of sufficient length to permit the link members to have the desired sliding or shifting movement, which movement may be cushioned by elastic or resilient cushioning means of any description, although we preferably employ coil springs 27 and arrange them in the end portions of the openings or recesses 25. Any number of the springs may be employed, and they may be arranged in any desired manner, but, as illustrated, they are arranged between the short ends of the openings 25 and the long sides of the link members 14, see Fig. 3. To retain the coil springs 17 in position and at the same time permit of their ready removal, their inner ends are strung over retaining lugs formed by cylindrical sleeves 29 fastened by means of screws 30 to the link members 14, as illustrated for example in Fig. 2. The outer ends of the springs 27 are retained in position and prevented from shifting on the short end walls of the openings or recesses 25 by arranging in said ends of the springs lugs or pins 31 formed on rectangular plates 32. These plates 32 engage the short end walls of the openings 25 and are of such size that they contact with each other and the longer walls of the openings, and, consequently, cannot shift about in such openings. While the shape and arrangement of the plates 32 prevent them from shifting, and, consequently, prevent the springs 27 from shifting, any one of the plates may be readily slid laterally or sidewise out of the opening 25 after certain parts of the hub have been removed to permit of access to the plates 32. To further prevent the springs from shifting laterally and to retain the link members 14, 15, within their guide openings or recesses 26, we preferably employ retaining plates 33, 34, on the outer sides of the supporting and guiding members 22, 23. The plate 33 is preferably formed integral with the axle sleeve 17, and is in the form of a radially projecting circular flange, but the plate 34 is loose or removable, as shown more clearly in Fig. 8. The central opening which receives the axle has a notch 35 to receive the head 36 of the key 18. This construction prevents the plate 34 from turning, while the nut 19 retains said plate upon the axle. The two plates or flanges 33, 34, are formed with suitable openings 36, so that oil may be introduced to lubricate the springs and link members.

When the wheel is to be used as a driving wheel, as in Fig. 2, we preferably use the usual friction brake member 37, which may be secured by bolts or other fastenings 38 to an enlarged portion of the inner end of the axle sleeve or member 17, whereby the brake member will be readily connected to the axle. To prevent the entrance of dust into the hub member or casing 3, the brake member 37 is preferably formed with an annular channel 39 having undercut walls and containing a suitable packing 40 which bears against the outer surface of the cover plate 11. Dust is effectively prevented from entering the hub member or casing from its outer side and access is permitted to the nut 19 by providing the outer plate 12 with a large central opening 41, and covering such opening by a removable dust cap 42. The latter is preferably screwed into the opening 41 and on its outer side is formed a flat-faced enlargement 43 adapted to be engaged by a wrench or other tool, whereby the dust cap may be applied or removed.

When the wheel is not to be used as a driving wheel, but merely as a supporting wheel, or a steering wheel, we preferably construct the device as shown in Fig. 9. In this form of invention the axle $16^a$ has suitable ball bearings interposed between it and the axle member $17^a$, so that the latter rotates freely with the hub casing and the rest of the wheel. The part $17^a$ is recessed, as shown at 44, to receive a ball race 45 for a series of bearing balls 46. The coacting bearing cone 47 is arranged on a shouldered portion of the axle $16^a$, as illustrated. A dust cap 48 excludes dust from the ball bearings. In this form of the invention the brake member 37 is omitted and in its place is substituted an annular plate $37^a$, formed with an annular groove to receive a packing $40^a$. The ball bearing at the outer end of the axle $16^a$ consists of a ball race 49 set in a groove in an enlarged portion of a spring and link retaining plate $34^a$, a coacting bearing cone 50 retained on the axle by a nut $19^a$, and an annular series of bearing balls 51 interposed between the cones 49, 50. In all other respects the construction and operation of this form of the invention is the same as that of the one just described.

From the foregoing it will be seen that our invention may be embodied in either the steering or driving wheels for automobiles, traction engines, and other motor vehicles, as well as in the wheels of wagons, cars and vehicles of any other description.

The employment of crossed members shiftable in different planes with their movement cushioned by springs or the like, and with the axle or axle member slidably engaged with them, produces a structure in which there will be no possible chance of placing lateral or sidewise strain on the springs, because the springs can only be compressed in the direction of their length. Furthermore, when the wheel embodying this principle is used as a driving wheel, the force will be applied through rigid but slidably engaged members having their movement cushioned by the springs, and, consequently, the force will be directly applied and there can be no lost motion and no lateral strain or pull placed on the springs. We, therefore, regard this crossed link structure as exceedingly important.

In operation, it will be seen that by reason of the fact that the squared portion of the axle can slide in planes at right-angles to each other in the two crossed rectangular link members 14, and that said link members can slide in planes at right-angles to each other, and also in planes at right-angles to the movement of the axle within said members, the axle has movement in any direction within certain limits and such movement is cushioned by the springs interposed between the link members and the wheel structure; consequently, the wheel rim and axle can shift with respect to each other without regard to the position of any point of the circumference or rim of the wheel with regard to any particular point on the axle, so that all shocks and jars will be absorbed by the cushioning springs or other devices. It will be further noted that the peculiar construction of our hub enables it to be produced at comparatively small cost, and further enables the device to be readily assembled or disassembled. To permit the wheel rim to be taken off the axle, it is only necessary to unscrew the dust cap 42, remove the cotter pin 21 and then unscrew the nut 19, whereupon the entire wheel and hub can be taken from the axle. After the hub has been removed it can be readily taken apart by removing the bolts 13 so that the spring and link supporting and guiding members 22, 23, may be removed from the two chambers formed in the hub member or casing 3. By removing the bolts 4 in the hub member or casing 3, one or more of the spokes may be removed and replaced, but when the bolts 4 are tightened the spokes will be securely and rigidly clamped in position.

While we have shown and described in detail the preferred embodiment of our invention, we wish it understood that we do not limit ourselves to the construction set forth, since various changes and modifications may be resorted to within the spirit and scope of our invention.

What we claim is:—

1. In a device of the character described, the combination of a central circular plate, crossed shiftable link members on opposite sides of said plate movable in planes at angles to each other, the opposing inner walls of said link members being flat and parallel, a flat faced element arranged in said link members and having its flat faces slidably engaged with the parallel walls of said link members, means for guiding said link members in their shifting or sliding movement, and means for cushioning said link members.

2. In a resilient wheel, the combination of a central circular plate, crossed shiftable link members on opposite sides of said plate movable in planes at angles to each other, said members having flat parallel inner walls, a flat faced axle member arranged for sliding movement in the link members and having its flattened faces slidably engaged with the parallel walls of said link members, a wheel structure having means to guide said link members in their shifting movement, resilient means for cushioning said link members, a drive axle, and means for removably securing said axle member to said axle.

3. In a resilient wheel, the combination of an open hub member having a central plate, removable plates closing the open sides of said hub member and forming a chamber on each side of said central plate, supporting plates removably arranged in the chambers of said hub member, crossed link members slidably arranged in said supporting plates and movable in planes at angles to each other, cushioning springs arranged in said supporting plates for cushioning said link members, an axle member arranged for sliding movement in said link members, retaining plates for retaining said link members within said supporting plates and axle, and means for retaining said axle member on said axle.

4. In a resilient wheel, the combination of an open hub member having a central plate, removable plates closing the open sides of said hub member, and forming a chamber on each side of said central plate, supporting plates removably arranged in the chambers of said hub member, crossed link members slidably arranged in said supporting plates and movable in planes at angles to each other, cushioning springs arranged in said supporting plates for cushioning said link members, an axle member slidable in said link members, a drive axle in said axle member, means for locking the axle member to the axle for rotation therewith, means for retaining the axle member on the axle, retaining plates for retaining the link members in the supporting plates, means for preventing the entrance of dust into the hub structure, and a removable dust cap on the outer plate of the hub structure.

5. In a resilient wheel, a hub comprising a circular plate having a central opening, a shiftable member on each side of said plate, each movable at an angle with the other and in a different plane therefrom, means for cushioning each member, and an axle extending through and supported in both of said shiftable members.

6. In a resilient wheel, a hub comprising a circular plate having a central opening, opposite annular rim flanges on said plate forming a chamber on each side thereof, a shiftable member in each chamber, each movable at an angle with the other and in a different plane therefrom, and an axle extending through and supported in both of said shiftable members.

In testimony whereof we have hereunto set our hands in presence of two subscribing witnesses.

EARL J. SEIFRIED.
ISAAC G. SEIFRIED.

Witnesses:
L. O. HILTON,
O. B. HOPKINS.

Copies of this patent may be obtained for five cents each, by addressing the "Commissioner of Patents, Washington, D. C."